Stephen & Zeller,
Pie Crimper,
N° 57,990. Patented Sep. 11, 1866.
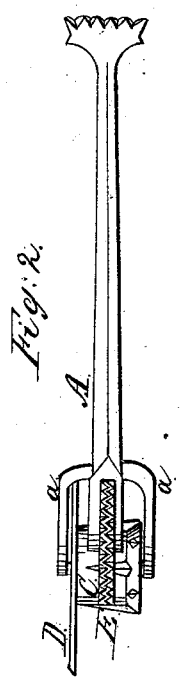
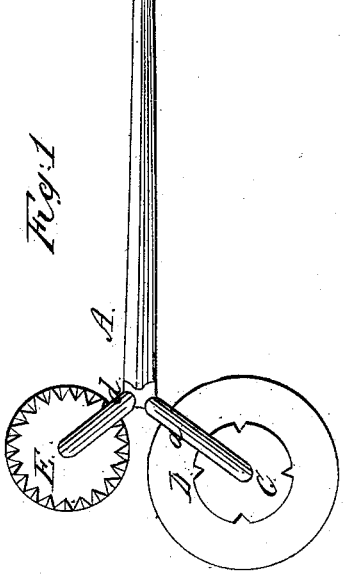
Witnesses:
J. M. Mason.
C. Alexander.
Inventor;
John Stephen
Wm. Zeller,
per C. A. Alexander,
atty.

UNITED STATES PATENT OFFICE.

JNO. STEPHEN AND WM. ZELLER, OF WOMELSDORF, PENNSYLVANIA.

IMPROVED PIE-RIMMER.

Specification forming part of Letters Patent No. 57,990, dated September 11, 1866.

*To all whom it may concern:*

Be it known that we, JOHN STEPHEN and WM. ZELLER, of Womelsdorf, in the county of Berks and State of Pennsylvania, have invented certain new and useful Improvements in Pie-Rimmers; and we do hereby declare that the following is a full, clear, and exact description of the same, reference being had to the accompanying drawing, and to the letters of reference marked thereon.

In the annexed drawing, making part of this specification, A represents a handle, at one end of which is formed two loops, $a$ and $d$, which support axles upon which the wheels E, the roller $c$, and cutter D revolve. C represents an annular cutter, which is intended for cutting off the dough around the edges of the plate. This cutter is secured to the roller $c$, and revolves with it.

The roller presses upon the dough near the edges of the plate, and its periphery being irregular and in such form as may be desired, it serves to unite and press the upper and lower crust of the pie, and also to ornament it. The wheel E is corrugated upon its periphery, and may be run over the upper crust of the pie for ornamenting it without cutting it.

The roller and knife work upon the pie at the same time, the one cutting the edges and the other uniting and ornamenting the edges of the crust, while the wheel works by itself, for ornamenting alone.

A butter cutter or print may be formed upon the other end of the handle A, of any desired shape.

Having thus fully described our invention, what we claim as new, and desire to secure by Letters Patent, is—

The within-described rimmer as an article of manufacture, consisting of a handle provided at one end with a rotary cutter secured to an irregular or ornamental roller and the corrugated wheel E, and at the other end with a butter cutter or print, substantially as represented.

JNO. STEPHEN.
WILLIAM ZELLER.

Witnesses:
JOHN P. JACOBS,
J. M. MASON.